E. M. HEYLMAN.
CULTIVATOR.
APPLICATION FILED NOV. 24, 1914.
1,155,569.
Patented Oct. 5, 1915.
3 SHEETS—SHEET 1.
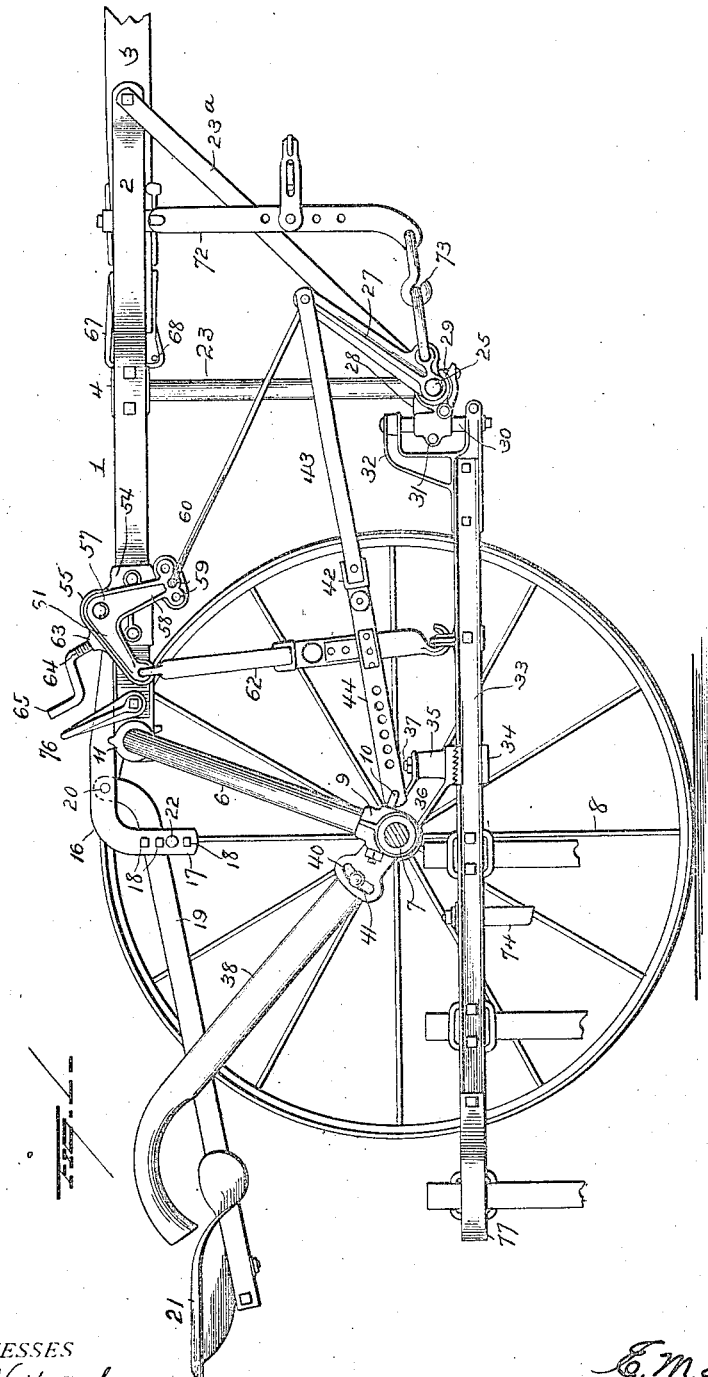
WITNESSES
E. J. Nottingham
G. F. Downing
INVENTOR
E. M. Heylman
By H. A. Seymour
Attorney

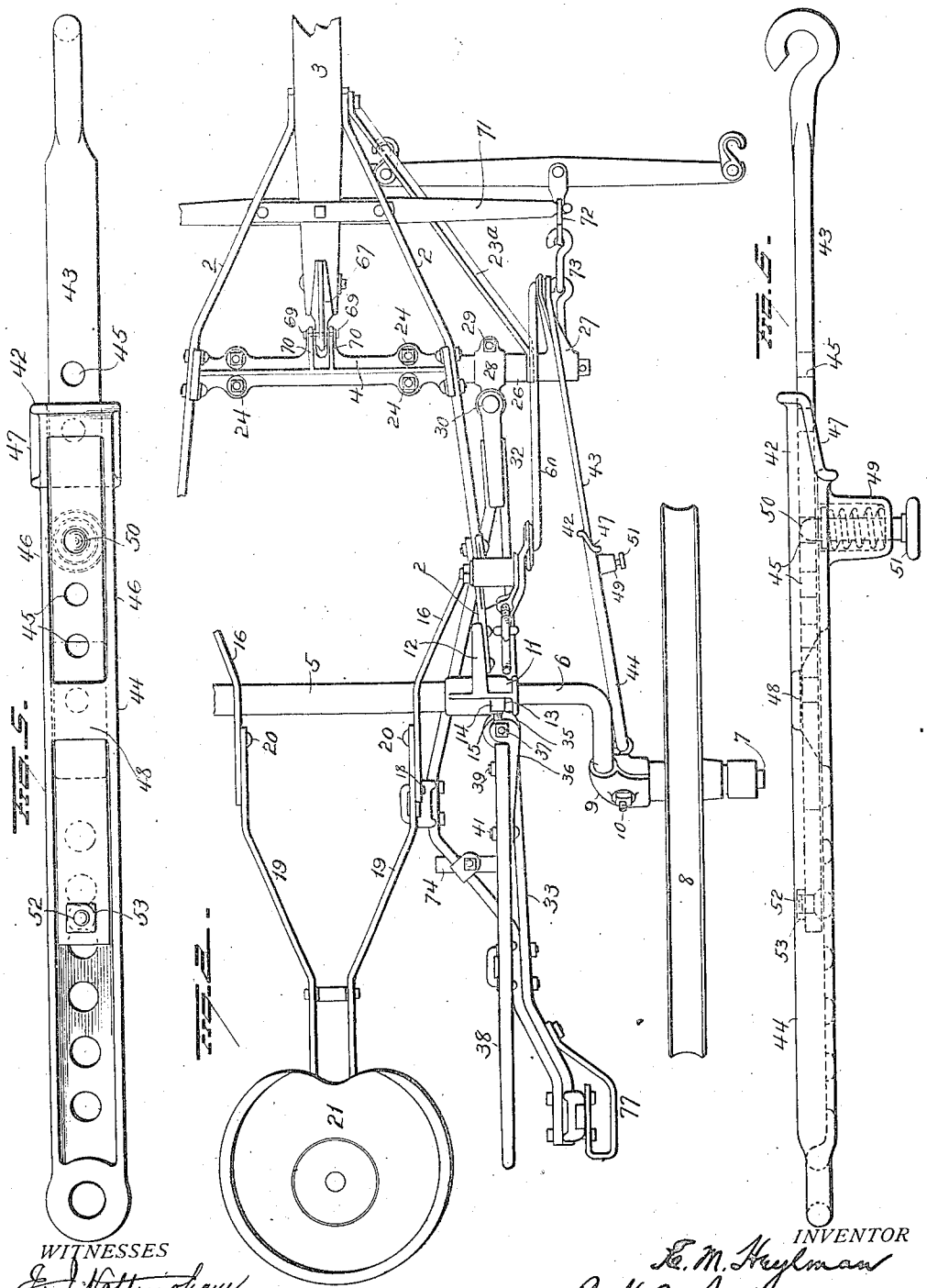

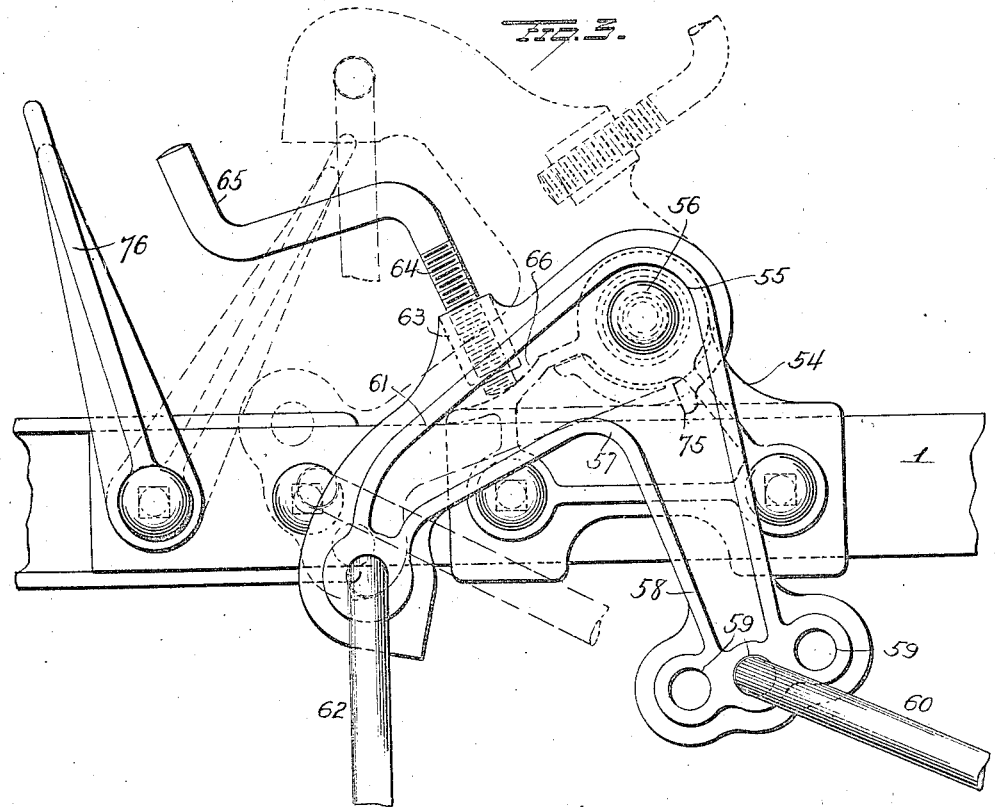
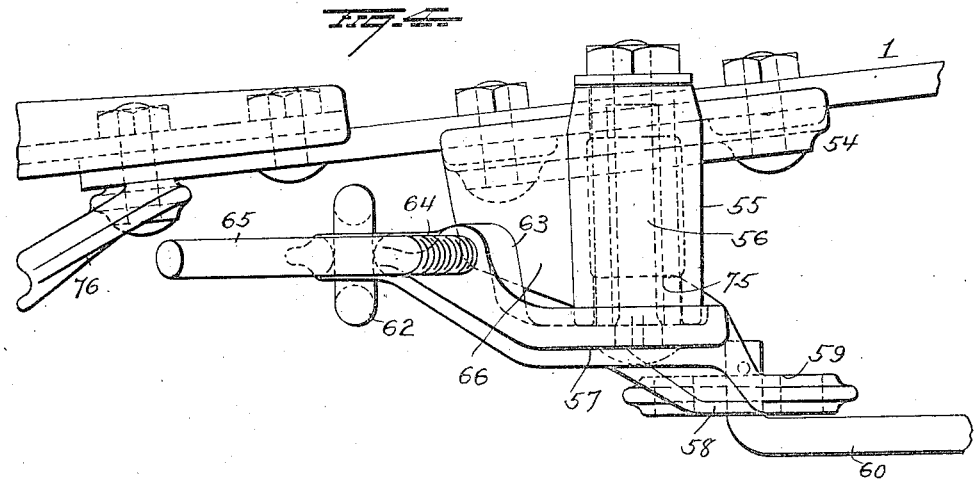

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

CULTIVATOR.

1,155,569.   Specification of Letters Patent.   Patented Oct. 5, 1915.

Application filed November 24, 1914.   Serial No. 873,807.

*To all whom it may concern:*

Be it known that I, EDWARD M. HEYLMAN, a citizen of the United States, and a resident of South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

This invention relates to improvements in cultivators, one object of the invention being to provide simple and efficient means to facilitate the raising and lowering of the cultivator gangs without the employment of hand levers and connections incident thereto, and without the use of counterbalancing springs.

A further object is to provide a cultivator structure of the counterbalanced type, with simple means of adjustment in accordance with the weight of the particular operator who rides on the seat of the cultivator.

A further object is to provide means, in a cultivator of the type described, for adjusting the cultivator gangs for depth.

A further object is to so construct and arrange the raising and lowering mechanism that the cultivator gangs may be automatically locked temporarily in elevated position.

A further object is to provide means for positively locking the raising means to retain the gangs in elevated position when the cultivator is to be transported over a road or from field to field.

A further object is to so construct a counterbalanced cultivator, that the raising and lowering may be accomplished with a minimum of applied power, and so that the balancing of machine may be easily and accurately accomplished.

A further object is to provide means whereby adjustment between the parts of raising and lowering mechanism may be quickly effected.

With these and other objects in view, the invention consists in certain novel features of construction and combination of parts as hereinafter set forth and pointed out in the claims.

In the accompanying drawings; Figure 1 is a side elevation of a cultivator embodying my improvements; Fig. 2 is a plan view and Figs. 3, 4, 5 and 6 are enlarged detail views.

1 represents a cultivator frame comprising longitudinal bars 2, 2 secured at their forward ends to a tongue 3; a forward cross bar 4 with which the rear end of the tongue is connected and relatively to which it may be adjusted vertically and a rear tubular cross bar 5,—the latter constituting a mounting for an arch axle 6 having journal members 7 mounted in the hubs of wheels 8. Sand bands 9 for the hubs of the wheels 8 are clamped to the arch axle by means of I-bolts 10, which latter also have another function as hereinafter explained.

Tubular brackets 11 are made fast to respective ends of the cross bar 5 of the frame and to arms 12 on these brackets, the rear ends of the frame bars 2 are secured. Each bracket 11 is made with a slot 13 for the accommodation of a collar 14 secured to the crank axle by means of a set screw 15. By these means, longitudinal adjustment of the crank axle relative to the frame 1 will be permitted.

Seat bar brackets 16 are bolted to the frame bars 2 and extend to the rear cross bar 5 of the frame 1, the rear ends of said brackets 16 terminating in depending arms 17, having series of perforations 18. Seat bars 19 are pivoted at 20 to the brackets 16, and to the rear portions of said bars 19, a seat 21 is adjustably secured. At points rearwardly of their pivotal supports, the seat bars rest upon bolts 22 carried by the arms 17 of the brackets 16. By inserting the bolts 22 in different holes 18 of said arms, the seat may be adjusted vertically.

A bail or gang arch 23 is suspended from the forward cross bar 4 and may be conveniently attached thereto by means of U-bolts 24 or similar connecting means. The depending members of the bail or arch 23 are provided at their lower ends with laterally projecting arms 25 on which sleeves 26 are loosely mounted, and on said arms 25, rock arms 27 are also mounted for a purpose hereinafter explained. The arch 23 is connected with the tongue by means of braces 23ª.

A two part bracket 28 is clamped to each sleeve 26 by means of a bolt 29 and to said bracket, a vertical pintle 30 is clamped by means of a bolt 31. To each pintle 30, a coupling 32 for a cultivator gang frame 33 is pivotally attached. By loosening the clamping bolt 31 the connection of the gang frame with the front arch may be adjusted vertically, and by loosening the clamping bolt 29, said connection may be adjusted laterally to adjust the cultivator gangs relatively to each other.

A clamp 34 is adjustably mounted on each gang frame and provided with an upper serrated member to receive the serrated bottom of a tubular post 35 at the forward end of a bracket 36, the parts being secured together and clamped to the gang frame by means of a bolt 37. To each bracket 36, the forward end of a handle 38 is pivotally connected at 39, and near the rear end of each bracket, a transverse slot 40 is provided for the passage of a clamping bolt 41. By thus attaching the handles to the cultivator gang frames, said handles may be adjusted forwardly or backwardly, laterally or vertically.

Connecting rods 42 are pivotally attached at one end to the arms 27 on the front arch 23, and at the other end, said rods are connected with the crank axle, the connections with the latter being effected through the medium of the eye bolts 10 which clamp the said bands 9 to said crank shaft. Each connecting rod 42 comprises two members 43 and 44, the former being connected with the arm 27 and the latter being attached to the eye-bolt 10.

The member 43 of each connecting rod is made with a plurality of holes 45 and enters between side flanges 46 on the member 44. The member 44 is made at its forward end with a head 47 through which the member 43 is guided and at a point intermediate the ends of the member 44, the side flanges are connected by a transverse web 48. Between the head 47 and the transverse web 48, the member 44 is made with a housing 49 for the accommodation of a spring pressed plunger 50 to enter any one of the holes 45 of member 43 and this plunger is provided with a suitable hand hold 51 whereby it may be withdrawn manually when it is desired to adjust the connecting rod lengthwise. A screw 52 is secured to the member 43 of the connecting rod near the rear end of said member and carries a nut 53 which may coöperate with the web 48 of member 44 and thus constitute a stop to limit the elongation of the connecting rod when the plunger 50 is withdrawn temporarily.

Secured to each bar 2 of the main frame 1 somewhat forwardly of the rear cross bar 5 in which the crank axle 6 is mounted is a bracket 54 provided with a bearing 55 for the fulcrum pin 56 of a bell-crank 57. The arm 58 of each bell-crank is enlarged transversely at its free end and provided with a plurality of holes 59, whereby the upper ends of a rod 60 may be adjustably connected with said arms—the lower ends of said rods being pivotally connected with the arms 27. The arm 61 of each bell-crank 57 is connected with one of the gang frames through the medium of a connecting rod 62. This connecting rod comprises longitudinally adjustable members, and is the same in construction as the connecting rod 42.

The arm 61 of each bell-crank 57 is made with a boss 63 having a threaded passage for the accommodation of a screw 64. This screw is provided with a hand crank 65 to permit its manual operation, and the free lower end of said screw engages a curved seat 66 on the bracket 54. By manipulating the screws 64, the cultivator gangs may be adjusted vertically to regulate the depth of working of the same. Should it be desired to effect a greater vertical adjustment of the cultivator gangs than can be accomplished with the use of the screws 64; this may be accomplished by adjusting the vertical connecting rods 62.

The vertical adjustment of the rear end of the tongue to accommodate the latter to horses of different heights, may be effected by a bracket 67 secured to the tongue and having a vertical series of holes 68 to receive (in any one of them) a pin 69 which also passes through lugs 70 on the forward cross bar 4.

An evener bar 71 is mounted on the tongue and from the ends of the same, bars 72 depend and to which latter the draft devices are attached. The lower ends of said depending bars are connected by means of links 73 with the rock arms 27.

It will be observed that the depending portions of the crank axle are inclined rearwardly to the wheel hubs so that the latter will be rearwardly of the pivotal connection of the crank axle with the frame of the machine. When the operator is upon the seat 21, his weight and the draft of the team will have a tendency to force the wheels farther to the rear, and I take advantage of this force to balance the gangs so that they may be easily operated by the handles 38 or by stirrups 74 secured to the gang frames. If the operator wishes to raise the gangs, a slight upward movement of the handles or the stirrups will raise said gangs. As a cultivator gang rises, the connection 62 between the same and the arm 61 of the bell crank will cause the latter to turn and impart motion, through the rod 60 to the rock arm 27, the latter being thus caused to move rearwardly and to impart motion through the connecting rod 42 to the crank axle, causing the wheels to be moved farther rearwardly. The turning movement of the bell-crank above described will be limited by the engagement of a stop 75 on said bell crank with the bracket 54 as shown by dotted lines on Fig. 3. When the gang frame has been raised until the bell-crank assumes to dotted line position shown in Fig. 3, the pivotal connection of the rod 60 with the arm 58 of the bell-crank, will have passed vertical alinement with the pivotal connection of the rod 62 with the arm 61 of said bell-crank and thus the gang frame will be retained automatically in its elevated position.

It will be found desirable to positively lock the gang frames elevated when the cultivator is to be transported over a roadway or from field to field, and for this purpose I provide manually operable props 76 mounted on the frame of the machine and movable to position to engage the arm 61 of the bell-crank 57, as shown in dotted lines, Fig. 3.

Guards 77 may be provided to prevent the gang shovels from engaging the wheels when the gangs are being raised.

When the gangs are raised, the front of the tongue will not rise because the pivot of the wheels is shifted relatively to the weight of the machine and operator and when the gangs are lowered to working position, the wheels are again shifted, so that there will be no neck-weight when the machine is at work.

With the use of my improvements, the mechanism can be accurately adjusted to operate with operators of different weights to counterbalance the gangs and render their manipulation easy; and the gangs may be accurately adjusted to regulate the working depth of the shovels.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a cultivator, the combination with a main frame, wheels, an arch axle connecting said frame with the wheels, and a seat connected with the main frame and disposed rearwardly of the mounting of the arch axle, of a cultivator gang frame connected with the main frame, a bell-crank mounted on the main frame, a rock-arm near the forward end of the gang frame, a connection between said rock arm and the arch axle, a connection between the rock-arm and one arm of the bell crank and a connection between the other arm of the bell-crank and the gang frame.

2. In a cultivator, the combination with a main frame, an arch axle, wheels, a seat rearwardly of the arch axle, a forward depending member, and a gang frame connected with the forward depending member, of a bell-crank on the main frame, a rock arm mounted on the forward depending member, an adjustable connection between said rock arm and the arch axle, a connection between the rock arm and one arm of the bell-crank, and a connection between the other arm of the bell-crank and the cultivator gang.

3. In a cultivator, the combination with a main frame, an arch axle, wheels, a forward depending member, a gang frame connecting with said forward depending member, and a seat rearwardly of the arch axle, of a rock arm mounted on said forward depending member, a bell crank on the main frame, a longitudinally adjustable connection between one arm of the bell-crank and the gang frame, a rod connected at one end to the rock arm and adjustably connected at its other end with the other arm of the bell-crank, and a connection between said rock arm and the arch axle.

4. In a cultivator, the combination with a main frame, an arch axle, wheels, a seat rearwardly of the arch axle, a forward depending member, and a gang frame connected with said forward depending member, of a lever pivoted to the frame, connection between said lever and the gang frame, means for adjusting said lever to adjust the gang frame vertically, and means connected with said lever and arch axle for moving the wheels rearwardly when a gang frame is raised.

5. In a cultivator, the combination with a main frame, an arch axle, wheels, a seat in rear of the arch axle, a forward depending member, and a gang frame connected with said forward depending member, of a bracket secured to the main frame, a bell-crank mounted on said bracket, a connection between one arm of the bell-crank and the gang frame, connections between the other arm of the bell crank and the arch axle, and an adjusting screw passing through an arm of the bell-crank and engaging the bracket to adjust the gang frame vertically.

6. In a cultivator, the combination with a wheeled frame including an arch axle, and a gang frame connected at its forward end with said frame, of a bell-crank mounted on the frame forwardly of the axle, a rock arm adjacent to the connection of the gang frame with the wheeled frame, and adjustable connection between said rock arm and the arch axle, a connection between the rock arm and one arm of the bell-crank, and an adjustbale connection between the other arm of the bell-crank and the gang frame.

7. In a cultivator, the combination with a wheeled frame including an arch axle, and a gang frame connected at its forward end with said frame, of a bracket on the wheeled frame forwardly of the axle, a rock arm adjacent to the connection of the gang frame with the wheeled frame, a connection between said rock arm and the arch axle, a bell-crank mounted on said bracket, a stop on said bell-crank to engage the bracket, a connection between one arm of the bell-crank and the rock arm, and a connection between the other arm of the bell-crank and the gang frame.

8. In a cultivator, the combination with a wheeled frame including an arch axle, and a gang frame connected at its forward end with said frame, of a rock arm adjacent to the connection of the gang frame with the wheeled frame, a bell-crank on the wheeled frame, a connection between one arm of the bell-crank and the gang frame, a connection between the other arm of the bell-crank and the rock arm, a connection between the rock arm and the arch axle, and an adjustable prop mounted on the wheeled frame to engage the bell-crank and lock the gang frame in elevated position.

9. In a cultivator, the combination with a wheeled frame including an arch axle, and a gang frame connected at its forward end with said frame, of bracket arms secured to said wheeled frame and projecting rearwardly beyond the arch axle, said bracket arms having depending portions each provided with a plurality of perforations, seat bars pivoted to said bracket arms, adjusting bolts passing through perforations of said depending portions to support said seat bars, a seat mounted adjustably on said seat bars, and connections between the wheeled frame and gang frame for counterbalancing the latter when the seat is occupied.

10. In a cultivator, the combination with a wheeled frame including an arch axle, and a gang frame connected at its forward end with said frame, of a rock arm located adjacent to the connection of the gang frame with the wheeled frame, a two-member connecting rod between the arch axle and the rock arm, one of said members provided with a manually operable spring-pressed plunger and the other member having holes to be engaged by said plunger to lock the two members adjusted relatively to each other, and said members having coöperable stops to limit the relative longitudinal movements of said members when the plunger is withdrawn, and connections between said rock arm and the gang frame.

11. In a cultivator, the combination with a wheeled frame including a forward arch, and a gang frame connected at its forward end therewith, of a rock arm adjacent to the connection of the gang frame with the wheeled frame, a bell-crank mounted on the wheeled frame, a connecting rod comprising longitudinally adjustable members connecting said rock arm with the arch axle, a connecting rod comprising longitudinally adjustable members connecting the gang frame with one arm of the bell-crank, and a rod connected at one end with the rock arm and adjustably connected at its other end with the other arm of the bell-crank.

In testimony whereof, I have signed this specification in the presence of two subscribing witnesses.

EDWARD M. HEYLMAN.

Witnesses:
  EDWIN NICAR,
  KATE E. BUCKLEY.